United States Patent
Izumikawa et al.

(12) 
(10) Patent No.: US 6,294,709 B1
(45) Date of Patent: Sep. 25, 2001

(54) PROCESS FOR DECOMPOSING FLUOROCARBONS REAGENT AND APPARATUS USED THEREFOR

(75) Inventors: Chiaki Izumikawa, Tokyo; Kazumasa Tezuka; Kazuto Ito, both of Okayama; Hitoshi Atobe; Toraichi Kaneko, both of Kawasaki, all of (JP)

(73) Assignees: Dowa Mining Co., Ltd., Tokyo; Dowa Iron Power Co., Ltd., Okayama; Showa Denko K.K., Tokyo, all of (JP)

(*) Notice: Subject to any disclaimer, the term of this patent is extended or adjusted under 35 U.S.C. 154(b) by 0 days.

(21) Appl. No.: 09/132,673

(22) Filed: Aug. 12, 1998

Related U.S. Application Data

(62) Division of application No. 08/883,579, filed on Jun. 26, 1997, now Pat. No. 6,022,489.

(30) Foreign Application Priority Data

Jul. 4, 1996 (JP) .................................................. 8-192691

(51) Int. Cl.$^7$ ....................................................... A62D 3/00
(52) U.S. Cl. ........................................ 588/206; 423/240 S
(58) Field of Search ............................... 423/240 R, 241, 423/240 S, 659; 427/109; 23/2; 588/205, 206, 207

(56) References Cited

U.S. PATENT DOCUMENTS

| | | | | |
|---|---|---|---|---|
| 3,565,574 | * | 2/1971 | Kearby et al. | ................ 23/2 |
| 4,631,183 | * | 12/1986 | Lalancette et al. | ................ 423/659 |
| 5,118,492 | * | 6/1992 | Okazaki et al. | ................ 423/659 |
| 5,496,583 | * | 3/1996 | Jansen et al. | ................ 427/109 |
| 5,817,284 | * | 10/1998 | Nakano et al. | ................ 423/240 S |

FOREIGN PATENT DOCUMENTS

| | | | | |
|---|---|---|---|---|
| 771579 | * | 5/1997 | (EP) | ................ A62D/3/00 |
| 7222826 | | 8/1995 | (JP) . | |
| 8187302 | * | 7/1996 | (JP) | ................ 588/209 |
| 9117229 | | 11/1991 | (WO) . | |

* cited by examiner

Primary Examiner—Wayne Langel
Assistant Examiner—Eileen E. Nave
(74) Attorney, Agent, or Firm—Sughrue, Mion, Zinn, Macpeak & Seas, PLLC

(57) ABSTRACT

Fluorocarbons including perfluorocarbons and hydrofluorocarbons are highly efficiently decomposed by contacting a gaseous fluorocarbon with a reagent comprising carbon and an alkaline earth metal or carbon, an alkaline earth metal and an alkali metal at an elevated temperature, the decomposed halogen being fixed to the reagent.

18 Claims, 6 Drawing Sheets

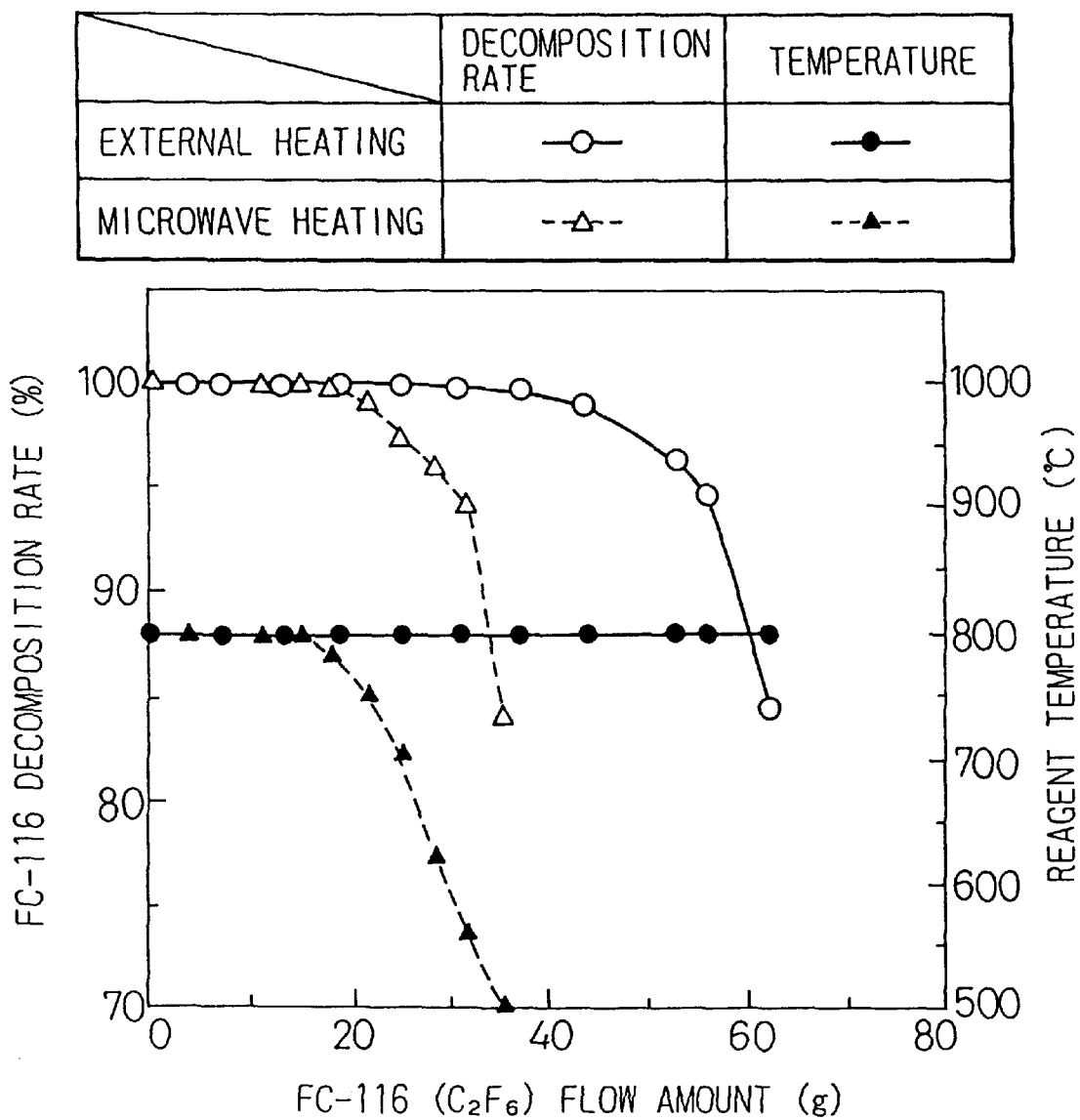

PROCESS FOR DECOMPOSING FLUOROCARBONS REAGENT AND APPARATUS USED THEREFOR

This is a divisional of application Ser. No. 08/883,579 filed Jun. 26, 1997, now U.S. Pat. No. 6,022,489, the disclosure of which is incorporated herein by reference.

TECHNICAL FIELD

The present invention relates to a process for efficiently decomposing fluorocarbons, particularly perfluorocarbons and hydrofluorocarbons with about 1–5 carbon atoms, as well as to a simple apparatus for this purpose.

BACKGROUND ART

Japanese Unexamined Patent Publication No. 6-293501 discloses a process for decomposing chlorofluorocarbons, involving heating magnetite by application of microwaves in an applicator, and then contacting the heated magnetite with chlorofluorocarbon gas. Also, Japanese Unexamined Patent Publication No. 7-24255 discloses a process for decomposing chlorofluorocarbons involving microwave irradiation of a mixture comprising a carbonaceous material and an alkaline earth metal oxide or salt for heat generation, and then contacting of the heated mixture with chlorofluorocarbon gas.

Since the chlorofluorocarbon-decomposing processes in the aforementioned publications all employ microwaves, their drawbacks have been the requirement of costly microwave-generating apparatuses and reactors limited to heat-resistant materials with good permeability to microwaves. Ceramics are materials with good permeability to microwaves, but these tend to react with fluorine and thus deteriorate in quality. Consequently, industrially economical and stable decomposition of chlorofluorocarbons is a problem for which a solution has been sought.

One technique for decomposing chlorofluorocarbons without using microwaves has been proposed in Japanese Unexamined Patent Publication No. 8-187302 by the present applicant, which is a chlorofluorocarbon decomposition process wherein chlorofluorocarbon gas is contacted and reacted with a substance containing a carbonaceous material and an alkaline earth metal compound heated in a non-oxidizing atmosphere. The process of this prior application has the advantage of allowing decomposition of chlorofluorocarbons using a normal heating furnace with an electrical heater, and as stated in the related specification, chlorofluorocarbons such as R-113 may be efficiently decomposed.

Nevertheless, subsequent research has revealed that many kinds of fluorocarbons are not decomposed by the process of this prior application, and the decomposition rate is not necessarily satisfactory for fluorocarbons with no chlorine groups, such as perfluorocarbons and hydrofluorocarbons, which are not mentioned in the specification of the prior application.

SUMMARY OF THE INVENTION

Consequently, an object of the present invention is to provide a process for efficiently decomposing fluorocarbons with no chlorine groups, such as perfluorocarbons and hydrofluorocarbons.

This object may be accomplished by contacting perfluorocarbon or hydrofluorocarbon gas with a reagent comprising carbon and at least one alkaline earth metal, at a temperature of 300° C. or higher and in the presence of 20 vol % or less (but not 0%) of gaseous oxygen.

More specifically, it has been found that fluorocarbon gas can be efficiently decomposed by continuously or intermittently feeding a treatment gas containing a perfluorocarbon or hydrofluorocarbon to a reactor filled with a reagent comprising carbon and at least one alkaline earth metal, continuously or intermittently discharging the exhaust gas from the reactor after the reaction, allowing or causing oxygen to be contained in the treatment gas before it is introduced into the reactor so that the oxygen concentration is 20 vol % or less in the treatment gas, and transferring heat necessary for decomposition of the perfluorocarbon or hydrofluorocarbon from outside the reactor to the reaction zone, or from inside the reactor to the reaction zone.

CO gas is sometimes copresent in the exhaust gas according to the process of the invention. In such a case, there may be added an additional step of oxidation of the CO in the exhaust gas to $CO_2$. In addition, for the process of the invention, the reactor may be made of a material such as a heat-resistant alloy and or corrosion-resistant alloy, for example a stainless steel or nickel-based alloy, and ceramics may also be used if they are resistant to fluorine and hydrogen fluoride (examples of which are ceramics made of aluminum fluoride). The reactor may be placed in a furnace which can maintain its internal atmosphere at a desired temperature, to transfer the heat in the furnace to the reagents in the reactor through the wall of the reactor.

Another object of the present invention is to provide a process for efficiently decomposing fluorocarbons which may contain, in addition to carbon and fluroine, hydrogen and/or more halogens other than fluorine, such as chlorine.

Thus, the present invention also provides a process for decomposing a fluorocarbon which comprises contacting a gaseous fluorocarbon with a reagent comprising carbon, at least one alkaline earth metal and at least one alkali metal at a temperature of 200° C. or higher A halogen component from the decomposed fluorocarbon may be fixed to said reagent in a manner such that the halogen elements derived from the fluorocarbon as a result of decomposition of the fluorocarbon are fixed into the reagent as halides of the alkaline earth metal and, optionally, of the alkali metal of the components of the reagent.

The present invention further provides a reagent for decomposing a fluorocarbon which comprises at least one alkaline earth metal, carbon and at least one alkali metal which may be in an atomic ratio of alkaline earth metal::carbon:alkali metal of 1.0:0.25–4.0:0.01–0.3. Preferably, not less than 50% by weight of the alkaline earth metal and alkali metal in the reagent is oxides.

In this second feature of the present invention, the term "fluorocarbon" refers to a fluorocarbon which may contain, in addition to carbon and fluorine, hydrogen and/or one or more halogens other than fluorine, such as chlorine.

The present invention further provides, as an apparatus designed to suitably accomplish the decomposition process described above, a fluorocarbon decomposition apparatus comprising a reactor filled with a reagent comprising carbon and at least one alkaline earth metal or carbon, at least one alkaline earth metal and at least one alkali metal, a treatment gas inlet leading into the reactor, a gas outlet for discharge of reacted gas from the reactor, a furnace in which the reactor is housed, a heating source for raising the atmospheric temperature in the furnace, a duct connecting the aforementioned treatment gas inlet and a fluorocarbon-containing gas source, and if necessary also an exhaust gas oxidizer connected by a tube leading to the gas outlet. The reactor may be constructed of a heat-resistant alloy or corrosion-resistant alloy. The fluorocarbon-containing gas source may be one containing a moderate amount of oxygen, such as a fluorocarbon-containing gas generated by a semiconductor manufacturing process.

BRIEF DESCRIPTION OF THE DRAWINGS

FIG. 9 is a graph showing the difference in perfluoroethane (FC-116) decomposition rates for cases where the heating system for the reagents is based on heating by an electrical heater and by microwave heating.

DESCRIPTION OF THE PREFERRED EMBODIMENTS

Figure 1:
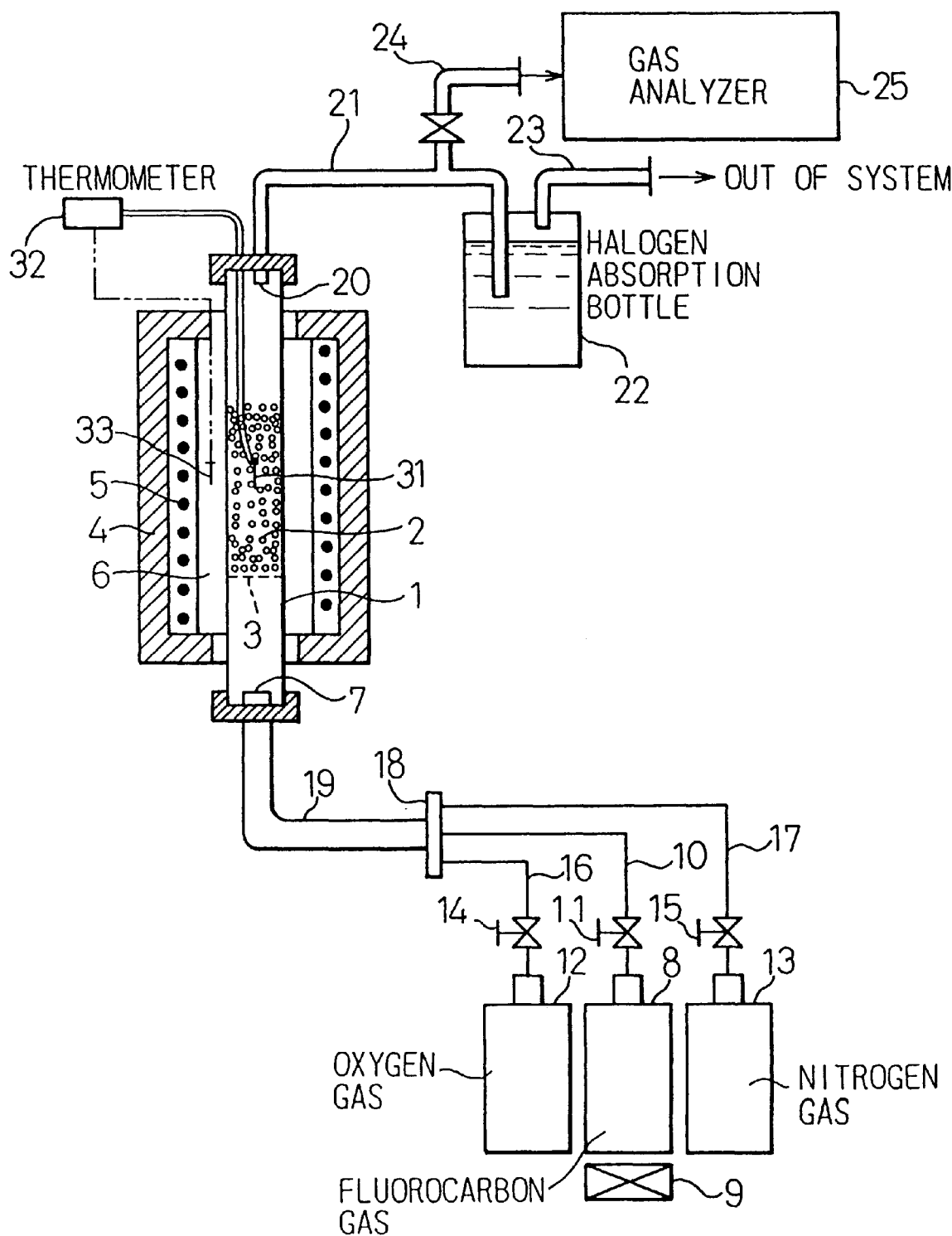
FIG. 1 is an equipment layout system diagram showing an embodiment of an apparatus for carrying out the process of the invention.

According to the first aspect, the present invention provides a process for decomposing perfluorocarbons or hydrofluorocarbons preferably with 1–5 carbon atoms, more preferably 1–3 carbon atoms, wherein the decomposed fluorine is caught by the reagent and the decomposed carbon (and hydrogen) is transported out in the exhaust gas as an oxidized substrate. Perfluorocarbons and hydrofluorocarbons suitable for decomposition treatment according to the invention include $CF_4$, $C_2F_6$, $C_3F_8$, $C-C_4F_8$, $CHF_3$, $CH_2F_2$, $C_2HF_5$, $C_2H_2F_4$, and the like, which can be readily vaporized at normal temperature (including those that vaporize in association with inert gases such as nitrogen).

For the decomposition reaction, it is important for the perfluorocarbon or hydrofluorocarbon gas to contact the reagent comprising carbon and at least one alkaline earth metal, which may be obtained from the carbonaceous solid material and alkaline earth metal compound, at a temperature of 300° C. or higher and in the presence of gaseous oxygen in an amount of 20 vol % or less (but not 0%).

The carbonaceous solid material, which is one of the materials forming the reagent, may be of one or more members selected from the group consisting of coke powder, char, coal, raw pitch, charcoal, active carbon and carbon black, with powder being the most preferred form. The alkaline earth metal compound which is the other material forming the reagent may be one or more compounds selected from the group consisting of calcium, magnesium, barium and strontium oxides, calcium, magnesium, barium and strontium hydroxides, and calcium, magnesium, barium and strontium carbonates and nitrates, of which are preferred calcium oxides, hydroxides, carbonates and nitrates, and among which quick lime, slaked lime and limestone are advantageous from the standpoint of ease of handling.

The reagent may be filled into the reactor with the carbonaceous solid material in powdery or granular form and the alkaline earth metal compound in powdery or granular form. Alternatively, a powdery carbonaceous solid material and powdery alkaline earth metal compound may preferably be mixed and then granulated into a size which is easily manageable. This allows the carbon and alkaline earth metal compound to be adjacent to each other and allows greater contact with the treatment gas due to the increased specific surface area (surface area per unit weight) of the reagent. Water or an organic binder may be used for the granulation, and drying or calcining of the granulated particles will produce grains with sufficient strength and porosity. The form or types of the carbonaceous solid material or powdery alkaline earth metal compound used as the starting materials may even be varied during production of the granulated particles, and they will contribute to the decomposition reaction of the invention so long as the desired proportion of the solid carbon and alkaline earth metal material is maintained in the granulated particles.

For example, when using char as the carbonaceous solid material and slaked lime as the alkaline earth metal compound, mixing the powders at a desired proportion, adding water, kneading the mixture, and then making granules of an easily manageable particle size, for example 1–10 mm, and preferably 1–5 mm, and calcining them (for example, at 500–850° C.) in a non-oxidizing atmosphere to make pellets, the volatile components in the char are almost completely removed during the calcining process and the slaked lime is converted to calcium oxide; consequently highly pure pellets composed mainly of carbon (C) and calcium oxide (CaO) are obtained. Reagents made of C and CaO obtained in this manner, having sufficient strength and being highly porous with a large specific surface area, may be suitably used for carrying out the process of the present invention.

The relative proportions of the carbonaceous solid material and the alkaline earth metal compound for forming the reagent will depend on the types of materials and compounds used, but based on the experience of the present inventors, it is preferred for the two to be present in equal amounts or for the latter to be slightly in excess, in terms of weight percentage. In terms of the molar ratio of the carbon (C) in the carbonaceous solid material and the metal oxide (MO) of the alkaline earth metal (M) of the alkaline earth metal compound, the molar ratio of C/MO may desirably be 0.9–2.3, preferably 0.9–1.9, and more preferably 1.4–1.9.

Generally speaking, perfluorocarbons and hydrofluorocarbons are more stable compounds than chlorofluorocarbons and hydrochlorofluorocarbons, and therefore their decomposition is considered to be more difficult to accomplish. However, perfluorocarbons and hydrofluorocarbons may be easily decomposed by contacting them with the reagents according to the invention in the presence of oxygen, at a temperature of 300° C. or higher. The lower limit for the necessary temperature may differ depending on the type of perfluorocarbon or hydrofluorocarbon. So long as the necessary temperature is maintained, a certain degree of decomposition may be achieved even in the absence of oxygen, but the decomposition efficiency may be poor. On the other hand, in the case of a chlorofluorocarbon or hydrochlorofluorocarbon gas, a phenomenon is seen in which the presence of oxygen does not contribute very greatly even using the same reagent and the same decomposition procedure, and a non-oxidizing atmosphere is even more conducive to decomposition.

Consequently, according to the process of the invention, the presence of a sufficient amount of oxygen gas in the treatment gas is indispensable, and some effect is seen even with a low oxygen concentration, but it may preferably be 5 vol % or greater. However, a high oxygen concentration exceeding 20 vol % results in over-consumption of the carbon in the reagent, and the effect of promoting the decomposition reaction becomes saturated. Thus, the oxygen concentration in the treatment gas may desirably be 0.5–20 vol %, preferably 2–15 vol % and more preferably 5–10 vol %. The reason that the presence of oxygen more efficiently promotes decomposition of perfluorocarbons and hydrofluorocarbons is not fully understood at the present time. When the composition of a reagent after the completion of the reaction was analyzed, the whole or some of calcium oxide, for example, was converted into calcium fluoride and the amount of the carbonaceous solid material was reduced. In addition, some of the carbonaceous solid material was clearly converted into $CO_2$ finally in view of the composition of $CO_2$ in the exhaust gas. Thus, the reagent in the present invention has a function such that it causes decomposition of perfluorocarbons and hydrofluorocarbons and catches the fluorine component as a fluoride of an alkaline earth metal such as calcium fluoride to accelerate the decomposition reaction. Incidentally, air may be used as the oxygen source in the treatment gas. In some cases, the oxygen in $CO_2$ may also be used as the oxygen source.

In order to contact the perfluorocarbon or hydrofluorocarbon (hereunder may be abbreviated to PFC or HFC, respectively, or simply referred to as fluorocarbon) with the reagent, it is convenient to supply it with an inert gas such as nitrogen gas, as a carrier, to the reagent either continuously or intermittently. When this is done the fluorocarbon is diluted by the inert gas, but the inert gas functions as a heat removal carrier, and substantially contributes nothing to the reaction. In the present specification, in cases where an inert carrier gas is also present, the oxygen concentration in the treatment gas refers to the oxygen concentration in the total gas volume including the carrier gas.

The process for decomposing a fluorocarbon according to the second aspect of the present invention comprises the use of a reagent comprising carbon, one or more alkaline earth metals and one or more alkali metals as a decomposing agent. The components of the decomposing reagent will be described below.

Carbon in the reagent may contribute to decomposition of the fluorocarbon when it exists in combination with the alkaline earth metal. If oxygen exists in the gaseous phase, carbon may also form carbon monoxide upon the decomposition reaction of the fluorocarbon. The content of carbon in the reagent may vary according to the progress of the decomposition reaction, but may preferably be at least 0.25:1.0 in an atomic ratio of carbon to the alkaline earth metal at least at the initial stage of the decomposition reaction. Where the ratio is less than 0.25:1.0, the decomposition reaction may not proceed satisfactorily. The content of carbon retaining in the reagent may preferably be at an atomic ratio of carbon to the alkaline earth metal of at least 0.25:1.0 even during the reaction. However, if carbon is contained in the reagent at an atomic ratio of carbon to the alkaline earth metal of more than 4.0:1.0, the content of the alkaline earth metal decreases and the decomposition reaction may not proceed satisfactorily. Therefore, the content of carbon in the reagent may preferably be in a range of 0.25 to 4.0:1.0, more preferably 0.5 to 3.0:1.0, especially 1.0 to 2.0:1.0 in an atomic ratio of carbon to the alkaline earth metal. It is desirable that this content of carbon in the reagent is maintained from the initial stage of the decomposition reaction and even during the reaction.

Carbon in the reagent may be in the form of char, active carbon, carbon black or coke powder. There may also be employed carbon fiber and graphite as well as a material comprising predominantly an inorganic carbonaceous substance. Where the reagent is to be in the form of granulated particles, a powder of at least one of these carbonaceous materials may be subjected to granulation together with other starting materials such as an alkaline earth metal compound and an alkali metal compound. Where the reagent is to be a calcined product, a powder of at least one of these carbonaceous materials may be subjected to granulation together with another starting material such as an alkaline earth metal compound or with other starting materials such as an alkaline earth metal compound and an alkali metal compound.

The alkaline earth metal in the reagent may act to decompose the fluorocarbon when existing in combination with carbon. For example, where the alkaline earth metal is calcium and the fluorocarbon to be decomposed is $C_2F_6$, the following reaction $$3CaO+C_2F_6 \rightarrow 3CaF_2+CO_2+CO$$

proceeds and, thus, the alkaline earth metal acts to fix fluorine contained in the fluorocarbon in the form of $CaF_2$. Thus, the alkaline earth metal is a basic component of the reagent according to the present invention. Therefore, in this specification, the contents of carbon and the alkali metal are defined by relative proportions with respect to the amount of the alkaline earth metal, and the exact content of the the alkaline earth metal depends on the contents of carbon and the alkali metal. Where the reactive proportion of the alkaline earth metal is too small, the relative proportion of the alkaline earth metal contributing to the decomposition reaction with respect to the amount of carbon decreases as the reaction proceeds, so that a high decomposition rate becomes impossible to obtain. On the other hand, where the relative amount of the alkaline earth metal is too large, the relative proportion thereof with respect to carbon is too high, so that a high decomposition rate also becomes impossible to obtain.

The alkaline earth metal may include Be, Mg, Ca, Sr, Ba and Ra and may be contained in the reagent as an oxide, a hydroxide or a salt such as a carbonate. Among these alkaline earth metals, Ca and Mg are preferred. The present inventors tested various alkaline earth metals and found that Ca and Mg exhibit a high efficiency in the decomposition of the fluorocarbons. These substances can be easily handled because the starting materials or decomposition products thereof exhibit a low toxicity. The starting materials of these substances which are stable and can be easily handled are in the form of an oxygen-containing compound such as an oxide, hydroxide and carbonate. Quick lime, slaked lime, marble, magnesium carbonate and dolomite may be mentioned as definite examples, these substances being especially preferred in the form of an oxide.

Where Ca or Mg is incorporated in the reagent in the form of an oxygen-containing compound as mentioned above, the fluorocarbons can particularly advantageously be decomposed. This is supposed to be based on the fact that the reagent becomes highly active when, in the decomposition reaction of the fluorocarbons, oxygen in the oxygen-containing compound reacts with carbon or is replaced with fluorine in the fluorocarbons or oxygen in the gaseous phase reacts with carbon in the reagent.

If an alkali metal exists in the reagent in combination with carbon and the alkaline earth metal, a fluorocarbon can be decomposed with a high decomposition rate even if the decomposition temperature is lowered as compared with the case where no alkali metal exists. The alkali metal may include Li, Na, K, Rb and Cs and it has been proved that the decomposition temperature can be remarkably lowered with K. The content of the alkali metal in the reagent may preferably be in a range of 0.01 to 0.3:1.0 in an atomic ratio of the alkali metal to the alkaline earth metal. Even if the alkali metal is contained in an amount such that the ratio is more than 0.3:1.0, inadvantageously, the effect may not be further enhanced and the contents of carbon and the alkaline earth metal are relatively decreased. Where the ratio is less than 0.01:1.0, the effect to lower the decomposition temperature may not be attained. More preferably, the content of the alkali metal may be in an amount such that the ratio is in a range of 0.02 to 0.2:1.0, especially 0.03 to 0.1:1.0.

K as an alkali metal may be incorporated into the reagent in the form of a compound thereof such as a hydroxide, carbonate, phosphate, aluminate, nitrate or sulfate. These compounds may be incorporated alone or as a mixture of two or more thereof, in the form of a powder if the compounds are in a powder form or after being ground into particles of a size not larger than 100 $\mu$m if the compounds are in a lump form. Although the reason why the fluorocarbons can be satisfactorily decomposed even at a low decomposition temperature when the K component exists in the reagent in an appropriated amount is not clear, it is supposed that the activity of the reagent is enhanced, in view of the fact that the decomposition reaction satisfactorily proceeds even where no oxygen is contained in the gas of the fluorocarbon to be decomposed, i.e., even in an oxygen-free atmosphere.

The total amount of carbon, alkaline earth metal and alkali metal in the reagent may desirably be not less than 50% by weight based on the weight of the reagent. Although the fluorocarbons can be decomposed where the total amount is less than 50% by weight, the amount is desirable to be at least 50% by weight to carry out the decomposition efficiently. The remaining components may include the components of the compounds or the compounds where the alkaline earth metal and alkali metal are incorporated as their compounds. Oxygen may preferably comprise most of the remaining components, but water, $CO_2$ and impurities associated with the starting materials may be contained.

The reagent for decomposing the fluorocarbons according to the present invention may be a solid comprising, as essential components, carbon, at least one alkaline earth metal and at least one alkali metal. The reagent may preferably be in a granulated form for enhancing the chance of contact with the fluorocarbons to be decomposed. For the granulation, powders of the above-mentioned starting materials are mixed, granulated with a suitable amount of water or optionally with the addition of an appropriate binder and then dried to evaporate water.

Most preferable granulated products may be calcined granulated products. These products may be calcined products obtained by calcining a powder mixture of a powdery carbonaceous material, powdery alkaline earth metal compound and alkali metal compound or by coating or impregnating a calcined product obtained by calcining a powder mixture of a powdery carbonaceous material and powdery alkaline earth metal compound with a solution of an alkali metal compound and then drying it to remove the volatile components such as a solvent. The carbonaceous materials, alkaline earth metal compounds and alkali metal compounds as mentioned hereinabove may be employed as the starting materials for obtaining the calcined products.

Typical calcined products may be those which are obtained by calcining a blend containing potassium a carbonaceous material powder, slaked lime and a potassium reverse compound under conditions sufficient to cause the reverse slaking reaction of slaked lime to proceed while allowing carbon to remain, or obtained by calcining a blend containing a carbonaceous material powder, calcium carbonate and a potassium compound under conditions sufficient to cause the decomposition reaction of calcium carbonate to proceed while allowing carbon to remain. The potassium compound to be incorporated into the blend may be in a powder form or in an aqueous solution form.

The blend may preferably be a granulated product in which the starting materials respectively having a particle size of not greater than 100 $\mu$m are uniformly blended, the production of the blend comprising weighing the starting materials to be blended and adding a suitable amount of water upon blending. The addition water may be replaced by the addition of an aqueous solution containing an alkali metal compound. A blender may advantageously be employed in which blending and granulation can be carried out concurrently, but may be one in which blending and granulation are carried out separately. A Henschel mixer and vertical mixer can be employed for the concurrent blending and granulation for example, but the blending of the starting materials may be carried out on a Henschel mixer or v-type mixer and then the granulation may be carried out on a tray type granulator or drum pelletizer.

Upon blending and granulation, a suitable amount of a binder may be incorporated in addition to water or an aqueous solution as mentioned above. An organic binder such as polyvinyl alcohol (PVA) may be employed as the binder. An inorganic binder such as an aluminum oxide- or silicon oxide-based binder may also be employed, but such an inorganic binder should be used in an amount not affecting the performance of the resulting decomposing reagent.

The calcining of the blended and granulated products should be carried out under conditions such that water and volatile components are removed and a calcined product having a moderate strength is obtained. In order to prevent carbon in the starting mixture being consumed through oxidation, it is preferable that the heat treatment is carried out in an inert atmosphere. Thus, in an inert atmosphere, the heat treatment at a high temperature becomes possible and a calcined product of a high strength can be obtained. For calcining, there can be used a continuous apparatus such as rotary kiln as well as a stationary furnace.

Preferably, the decomposing reagent according to the present invention has a low water content and generates little water vapor during the decomposition reaction, so as to exhibit a moisture discharge of 15% by weight when heated to 800° C. in an inert atmosphere.

The process and apparatus for decomposing a fluorocarbon using the above-mentioned reagent will be described below.

The decomposition treatment of a fluorocarbon according to the present invention may be carried out by passing a fluorocarbon-containing gas to be treated through a reactor filled with the reagent. The temperature of the reagent or the reaction temperature may be kept at 200° C. or higher and the treatment may be carried out in a non-oxidizing or weakly oxidizing atmosphere.

The reaction temperature to be controlled and the atmosphere for the reaction may be suitably selected depending on the kind of the fluorocarbon. For example, for perfluorocarbons (PFC), hydrofluorocarbons (HFC), hydrochlorofluorocarbons (HCFC) and chlorofluorcarbons (CFC), the minimum decomposition temperature capable of satisfactorily decomposing them varies depending on the kind of the fluorocarbons, and the inventors have found by testing that these fluorocarbons have minimum decomposition temperatures which become lower in the above-mentioned order. The decomposition efficiency is high irrespective of the presence or absence of oxygen in the treatment gas, which is thought to be because the reagent according to the present invention containing an alkali metal becomes to have a high activity as compared with a reagent not containing an alkali metal. Therefore, although the decomposition may be satisfactorily carried out in a non-oxidizing atmosphere, the decomposition may be more advantageously carried out in a weakly oxidizing atmosphere such as in an atmosphere of a treatment gas which contains 0.01 to 25% by volume of oxygen. The concentration of the fluorocarbon in the treatment gas is not critical and a 100% fluorocarbon gas can be decomposed as mentioned below in the examples, but the treatment gas may be diluted by an inert gas or an oxygen-containing gas. Thus, a desirable decomposition temperature may depend on the kind of the fluorocarbons to be decomposed, the concentration of the fluorocarbon in the treatment gas, the concentration of the oxygen-containing gas in the treatment gas, SV (superficial velocity), LV (linear velocity), the conditions of the gas being mixed with other gases, and the composition and form of the reagent according to the present invention. For example, when the SV is low, a desirable decomposition can be attained even at a low temperature.

Therefore, by suitably selecting the treating conditions, the decomposition treatment of a fluorocarbon according to the present invention can be carried out with a high efficiency with respect to perfluorocarbons consisting of fluorine and carbon, and huydrofluorocarbons consisting of fluorine, hydrogen and carbon, as well as halogenated fluorocarbons consisting of fluorine, carbon and a halogen other than fluorine, and halogenated hydrofluorocarbons consisting of fluorine, hydrogen, carbon and a halogen other than fluorine.

The decomposition treatment can be carried out on a fluorocarbon decomposition apparatus comprising a reactor filled with the above-mentioned reagent, a treatment gas inlet leading into the reactor, a gas outlet for discharge of treated gas from the reactor, a furnace in which the reactor is housed, a heating source for raising the atmosphere temperature in the furnace to 200° C. or higher, a duct connecting the treatment gas inlet and a fluorocarbon-containing gas source, and optionally, an exhaust gas oxidizer connected by a tube leading to the gas outlet.

FIG. 1 shows an embodiment of an apparatus for carrying out the process of the invention according to the first and second aspects thereof. In this drawing, 1 is a metal reactor (tube), which is filled with a reagent 2 comprising carbon and at least one alkaline earth metal or carbon and at least one alkaline earth metal and at least one alkali metal. This embodiment has the tubular reactor 1 standing vertically, and the reagent 2 is held over a fixed gas transmissible layer 3. The metal tube of the reactor 1 may be made of stainless steel or a nickel-based alloy.

The reactor 1 is situated in a heating furnace 4. The heating source of the heating furnace 4 shown in the drawing is an electrical heater 5 with a heating element which generates heat electrically, and the temperature of the furnace atmosphere 6 is raised to a desired temperature with the electrical heater 5, while the heat inside the furnace is transferred to the reagent 2 via the metal reactor wall. The heat source is not restricted to an electrical heater so long as it is capable of raising the temperature of the furnace atmosphere 6 to the desired temperature. For example, high-temperature gas such as combustion exhaust gas may also be used as the heat source.

A treatment gas inlet 7 is provided in the reactor 1 situated inside the heating furnace 4, and the treatment gas inlet 7 is connected by a tube to a container 8 containing a fluorocarbon. The container 8 is indirectly heated by heating means 9 if necessary, for heating to raise the pressure of the fluorocarbon gas inside the container 8. A flow adjustment valve 11 is also provided between the container 8 and the gas discharging tube 10. In the embodiment in FIG. 1, an oxygen gas cylinder 12 and a nitrogen gas cylinder 13 are separately provided in addition to the container 8, so that once oxygen gas and nitrogen gas have been fed to a gas header 18 through the gas discharging tubes 16, 17 equipped with flow adjustment valves 14, 15, the fluorocarbon is fed to the header 18 and the nitrogen gas as a carrier is combined with the fluorocarbon gas while the oxygen gas may optionally be mixed therewith, after which the treatment gas mixed at the header 18 is fed into the treatment gas inlet 7 of the reactor 1 through the gas feeding tube 19.

Alternatively to this embodiment, the fluorocarbon, nitrogen and oxygen may be premixed as a mixed gas and prepared in a single container for feeding of the mixed gas directly into the treatment gas inlet 7, or the nitrogen gas may be fed into the container 8 to forcefully feed the fluorocarbon out of the container, while adding oxygen gas along the discharging tube. In any case, preferably, the oxygen gas feeding tube may optionally be connected to the container 8 itself or to the tube running from the container 8 to the treatment gas inlet 7.

In addition, an exhaust gas duct 21 is connected to the gas outlet 20 of the reactor 1, and this exhaust gas duct 21 is connected to a halogen absorption bottle 22 which is equipped with a gas discharging tube 23. A sampling tube 24 is connected to the exhaust gas duct 21, and sampled exhaust gas is fed to a gas analyzer 25 through the sampling tube 24.

Figure 2:
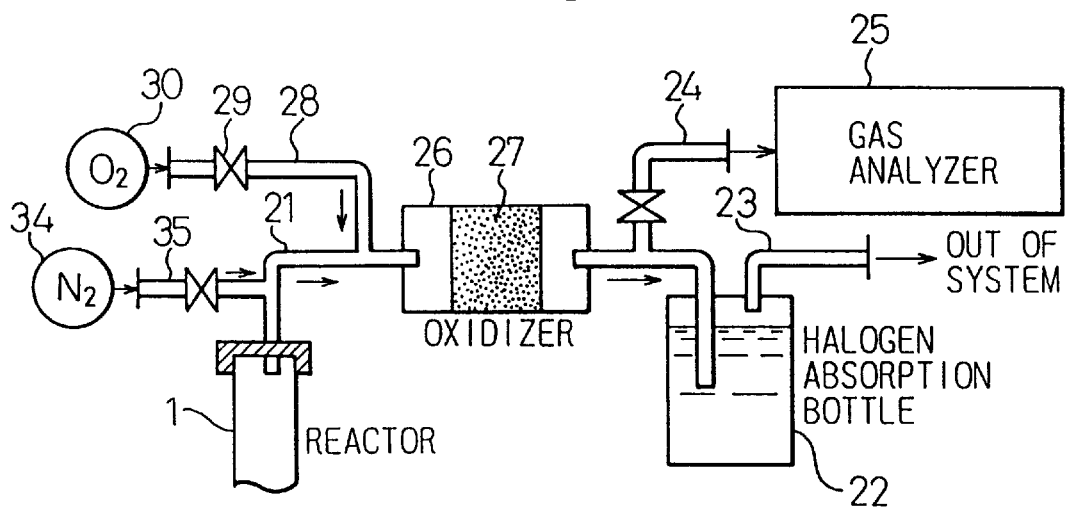
FIG. 2 is an equipment layout system diagram showing another embodiment with the exhaust gas duct section of an apparatus for carrying out the process of the invention.

FIG. 2 shows another embodiment with an exhaust gas oxidizing apparatus 26 connected to the exhaust gas duct 21 for exhaust gas discharged from the reactor. The exhaust gas oxidizing apparatus 26 is designed so that substantially the entire amount of exhaust gas passing through it also passes through a catalyst layer 27, and the catalyst layer 27 is filled with an oxidizing catalyst which promotes an oxidation reaction of CO to $CO_2$. The catalyst used may be a noble metal catalyst such as platinum or palladium supported on a heat-resistant carrier, or a hopcalite catalyst. An oxygen inlet tube 28 is also connected which adds oxygen to the exhaust gas before it enters the exhaust gas oxidizing apparatus 26, and a flow adjustment valve 29 in the oxygen inlet tube 28 adjusts the amount of oxygen added to the exhaust gas from the oxygen source 30. A tube 35 is provided for introducing nitrogen gas 34 to the exhaust gas duct 21 upstream from the point of oxygen introduction, and by introducing the oxygen after mixture of the nitrogen gas 34 from this tube 35 with the exhaust gas to lower the CO concentration of the exhaust gas, it is possible to control the phenomenon of combustion of CO to $CO_2$ at the point of oxygen introduction, even in cases of high CO concentration in the exhaust gas. Air may also be used as the oxygen source 30 added to the exhaust gas. The exhaust gas which has passed through the exhaust gas oxidizing apparatus 26 is then fed to a halogen absorption bottle 22 by the same path as in FIG. 1. A sampling tube 24 for sampling a part of the exhaust gas is provided and the sampled exhaust gas is fed to a gas analyer 25 through the sampling tube 24.

In the apparatuses shown in FIGS. 1 and 2 the atmospheric temperature inside the heating furnace 4 is transferred to the reagent 2 in the reactor 1 by way of the container wall, but the temperature also changes as a result of the heat balance due to reactions and the balance in heat capacity by entrance and exit of the introduced gas and exhaust gas; consequently, by inserting a temperature sensor (thermocouple) 31 at roughly the center of the reagent 2 as shown in the drawing, the temperature of the reaction zone may be monitored by a thermometer 32, and the supply of heat from the heat source 5 regulated so as to maintain the desired temperature. In addition, temperature regulation of the heating furnace itself may be suitably accomplished based on monitoring of the temperature of the internal atmosphere 6 of the heating furnace 4 using a temperature sensor 33.

Thus, the fluorocarbon in the treatment gas decomposes almost completely (with a decomposition rate of near 100%), while the decomposed fluorine reacts with the alkaline earth metal in the reagent to form an alkaline earth metal fluoride, thus removing the fluorocarbon or fluorine retained in the exhaust gas. All of the CO in the exhaust gas may also be oxidized to $CO_2$ by the exhaust gas oxidizing apparatus 26.

Figure 3:
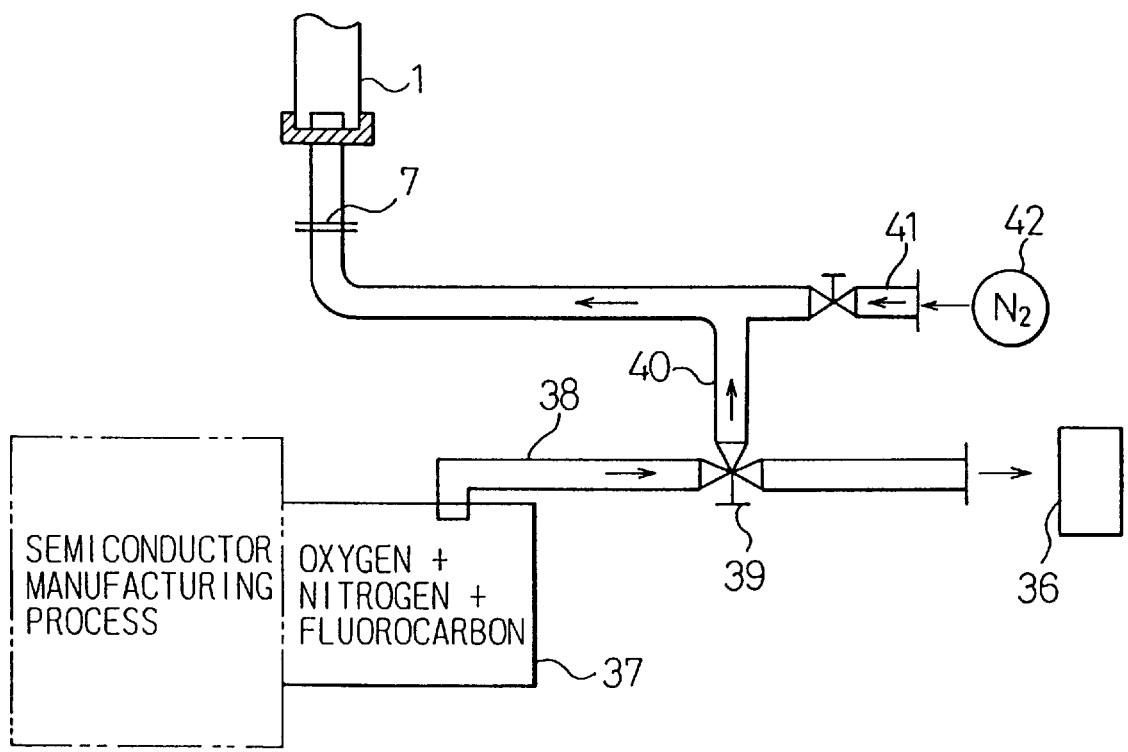
FIG. 3 is an equipment layout system diagram showing another embodiment with the treatment gas inlet section of an apparatus for carrying out the process of the invention.

FIG. 3 shows an embodiment of decomposition treatment according to the invention for a fluorocarbon from a semiconductor manufacturing process. The fluorocarbon 37 contained in the exhaust gas from the semiconductor process is generally fed to a routine processing step 36 via a tube 38. When applied according to the present invention, the fluorocarbon supply tube 38 is connected to the treatment gas inlet 7 of the reactor 1. In the embodiment shown here, a branching tube 40 leads from the supply tube 38 through a three-way valve 39, and the branching tube 40 is connected to the treatment gas inlet 7. A nitrogen gas supply tube 41 is also connected to the branching tube 40, and nitrogen gas is pressure pumped from a nitrogen gas source 42 into the branching tube 40 in a flow-variable manner. Thus, even when the three-way valve 39 is switched to reduce the flow of the starting material gas in the branching tube 40, the necessary amount of nitrogen gas is still blown from the nitrogen gas source 42, to thus allow the starting material gas to be transported to the treatment gas inlet 7 at a substantially constant flow rate.

Figure 4:
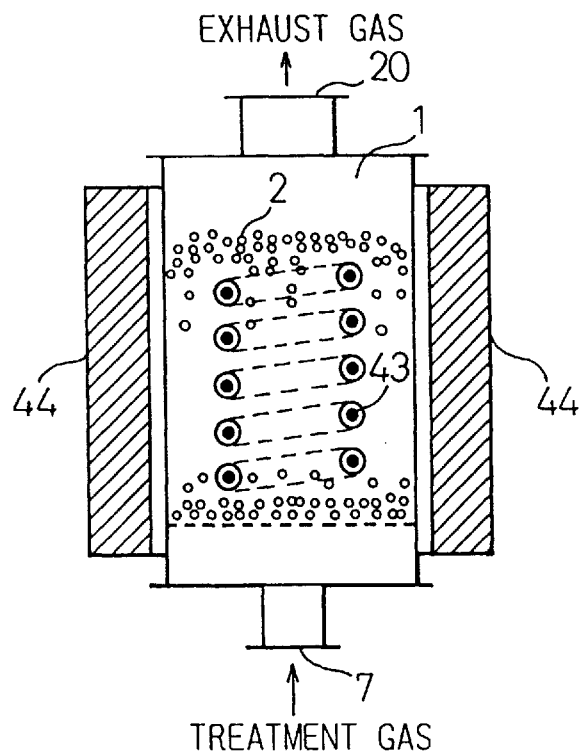
FIG. 4 is a schematic cross-sectional view of a reactor section showing an embodiment of heating reagents from inside the reactor according to the process of the invention.
Figure 5:
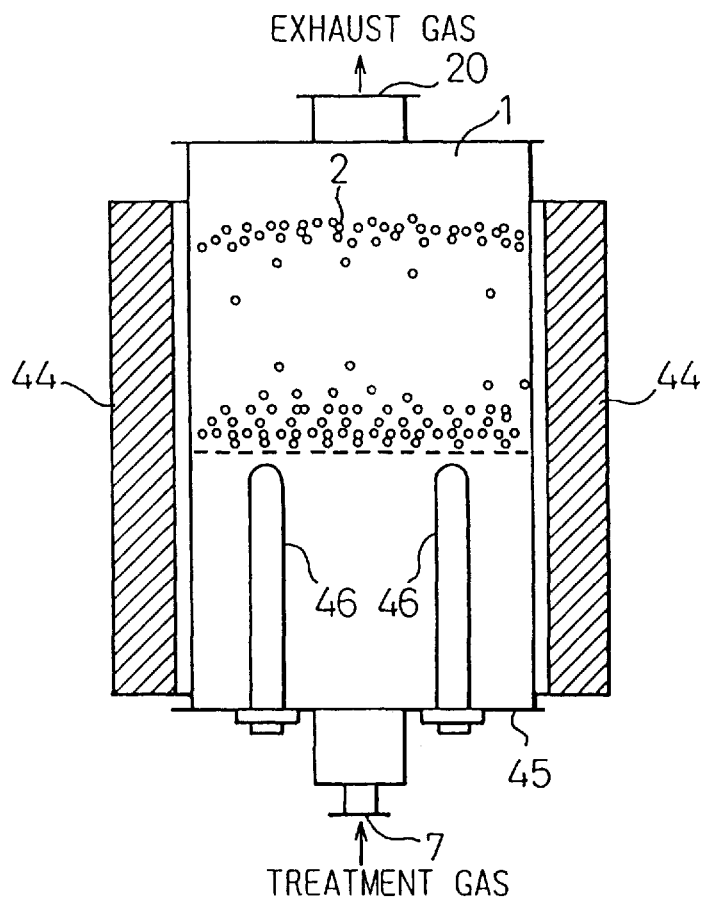
FIG. 5 is a schematic cross-sectional view of a reactor section showing another embodiment of heating reagents from inside the reactor according to the process of the invention.

FIGS. 4 and 5 show embodiments of the invention wherein a heating source is situated inside the reactor 1 and heat is transferred from the inside of the reactor to the reagent 2. In these drawings, 44 is a heat-resistant furnace material which is wrapped around the reactor 1, 7 is a treatment gas inlet leading into the reactor, and 20 is a gas outlet leading from the reactor.

In the case shown in FIG. 4, electrical heat-generating heating elements 43 are situated inside the layer filled with the reagent 2, and the heating elements 43 are covered with a corrosion-resistant, heat-resistant cover. Since, according to this embodiment, heat is transferred from the inner layer filled with the reagent 2, it is possible to increase the temperature-elevating rate to raise the reagent to the desired temperature, while also minimizing heat loss.

In the case shown in FIG. 5, the inside of the reactor 1 is divided into a filled layer of the reagent 2 and a heating layer, and is designed so that the treatment gas introduced into the reactor 1 flows through the heating layer into the reagent filled layer. In the heating layer, heating elements 46 for electrical heating are mounted on reactor caps 45. The treatment gas passes through the heating layer and receives heat which it then transfers to the reagent 2. This embodiment has advantages in that the electrical heater is placed inside the reactor resulting in greater heat usage efficiency, and deterioration of the heating element 46 is minimized since the heating element 46 does not contact the reagent or the reacted gas.

Figure 6:
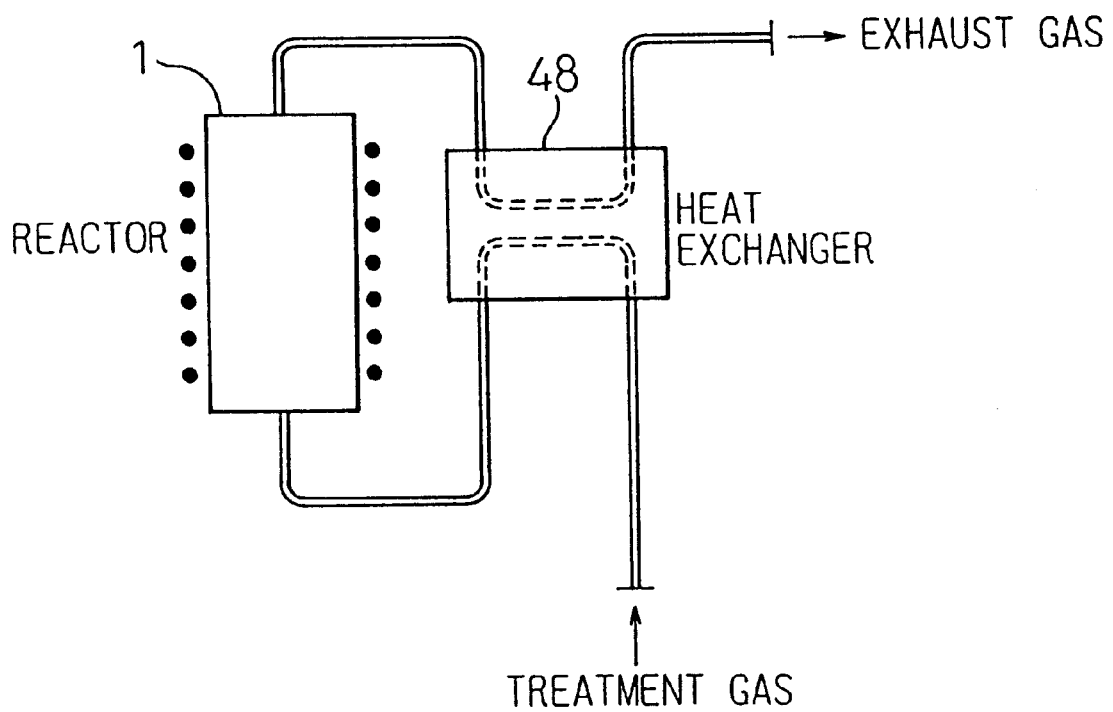
FIG. 6 is a view of an embodiment of heat exchange between treatment gas prior to entering the reactor and exhaust gas which has left the reactor, during the process of the invention.

FIG. 6 is a view of an embodiment according to the invention provided with a heat exchanger 48 situated for heat exchange, between the treatment gas prior to entering the reactor 1 equipped with a heat source, and exhaust gas which has left the reactor 1. The heat exchanger 48 transfers the heat of the exhaust gas to the treatment gas in order to recover the heat, thus reducing the heat consumed by the heat source.

In the case of the apparatus of the invention described above, the decomposition reaction is complete once the filled reagent has been fully consumed. The reaction end point may be determined based on the time at which fluorocarbons or other fluorine compounds in the exhaust gas begin to be detected. Once the reaction is complete, fluorocarbons may be subsequently decomposed in the same apparatus by employing a batch system whereby operation of the apparatus is suspended and the reagent is reloaded to reinitiate the reaction. In order to perform the batch system in a continuous manner, a plurality of similar apparatuses may be positioned in series in order to employ a dual switching system designed so that while one apparatus is operating the reagent of the other apparatus is replaced, and when the first apparatus is suspended the gas flow is switched to the other apparatus. In addition, by using a design which allows continuous or intermittent feeding of the reagent into the reactor and continuous or intermittent removal of the used reagent from the reactor, long-term continuous operation of the same apparatus is possible.

Figure 7:
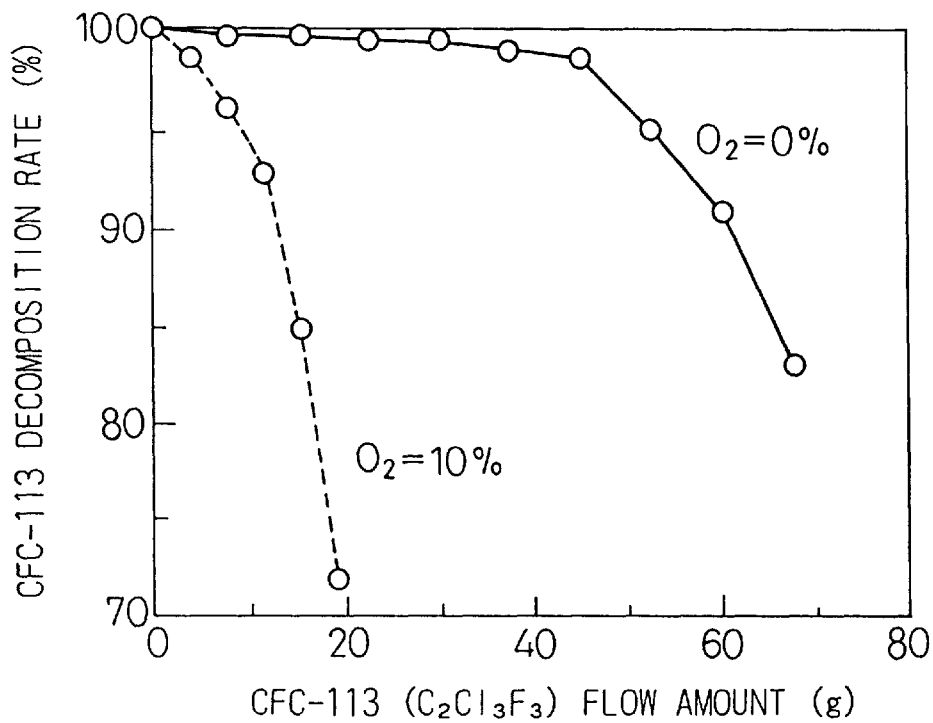
FIG. 7 is a graph showing the relationship between trichloro-trifluoroethane (CFC-113) inflow volume and CFC-113 decomposition rate for decomposition treatment of CFC-113 with 0% and 10% oxygen concentrations in the treatment gas.

FIG. 7 is a graph showing the relationship between trichloro-trifluoroethane (CFC-113) inflow volume and CFC-113 decomposition rate, similar to the comparative examples which follow, wherein, for decomposition treatment of CFC-113 having chlorine as a constituent, the CFC-113 concentration is 10 vol %, the gas flow rate is 0.15 liters/min, the C/CaO molar ratio in the reagent is 1.67 and the reagent maximum temperature is 800° C., for oxygen concentrations in the treatment gas of 0% and 10%. The decomposition rate of CFC-113 will be described later, and the CFC-113 flow amount is the cumulative amount of CFC-113 (g) which has flowed to the reactor until reaching the corresponding decomposition rate. The results in FIG. 7 show that for decomposition treatment of chlorofluorocarbons which have chlorine as a constituent, the presence of oxygen in the treatment gas drastically lowers the decomposition rate.

Figure 8:
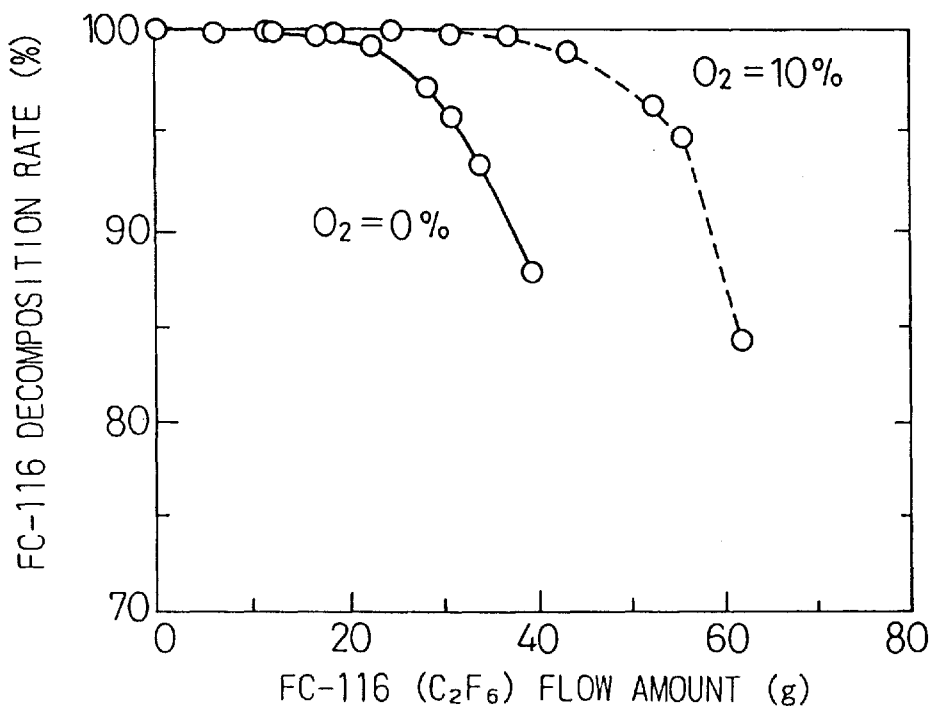
FIG. 8 is a graph showing the relationship between perfluoroethane (FC-116) inflow volume and FC-116 decomposition rate for decomposition treatment of FC-116 with 0% and 10% oxygen concentrations in the treatment gas.

On the other hand, FIG. 8 is a graph showing the relationship between perfluoroethane (FC-116) inflow volume and FC-116 decomposition rate wherein for decomposition treatment of FC-116, the FC-116 concentration is 10 vol %, the gas flow rate is 0.15 liters/min, the C/CaO molar ratio in the reagent is 1.67 and the reagent maximum temperature is 800° C., for oxygen concentrations in the treatment gas of 0% and 10%, similar to Example 1 described below. That is, the case in FIG. 8 is under the same reaction conditions as that of FIG. 7, except that the trichloro-trifluoroethane used as the gas for decomposition is replaced with perfluoroethane. In FIG. 8 however, in contrast to the case in FIG. 7, the decomposition rate is drastically lowered by the absence of oxygen in the treatment gas.

FIG. 9 is a graph showing the difference in perfluoroethane (FC-116) decomposition rates for cases where the heating system is based on heating by an electrical heater as according to Example 1, and also by microwave heating. The reaction conditions were, in both cases, a fluorocarbon concentration of 10 vol %, a gas flow rate of 0.15 liters/min, an oxygen concentration of 10 vol % and a C/CaO molar ratio of 1.67 in the reagent, and microwave heating was accomplished using a reaction apparatus with the same capacity as in Example 1 described below, except that the reaction tube was made of a microwave-permeable ceramic material and situated inside a microwave-irradiating applicator.

As demonstrated by the results in FIG. 9, when heating was accomplished with an electrical heater, the maximum temperature of the reagent in the reaction tube was maintained at 800° C. from start to finish, and the decomposition rate was near 100% up to a cumulative flow of the FC-116 of about 40 g, falling to 95% when the flow amount reached about 55 g. With microwave heating, however, the decomposition rate began to fall and the reagent temperature could not be kept at 800° C. when the FC-116 cumulative flow reached about 20 g, and the decomposition rate and reagent temperature fell drastically thereafter. Specifically, when the FC-116 cumulative flow reached 29 g, the decomposition rate was 95% and the reagent temperature was 600° C., and both fell drastically thereafter, making decomposition treatment impractical. This is believed to be because in the case of microwave heating, the reagent (especially carbon) is oxidized by oxygen in the treatment gas, making it impossible to maintain the intended reagent temperature for a long period with microwave heating.

EXAMPLE 1

The process of the present invention was carried out using an apparatus based on the same principle shown in FIG. 1. That is, an austenite stainless steel (SUS304) reaction tube with an inner diameter of 28 mm and a length of 1000 mm was inserted along the axial center of a tubular furnace (electrical capacity: 20 KW) equipped with a heating element (kanthal alloy) based on electrical heating, and the center of the furnace inside the reaction tube was filled with 100 g of reagent particles prepared using char and slaked lime as raw materials. The reagent was prepared by combining char with a maximum particle size of 250 $\mu$m and slaked lime with a maximum particle size of 250 $\mu$m in a weight proportion of 1:3, mixing with a Henschel mixer and adding water for granulation, and then drying at 110° C. for 4 hours and heating in a nitrogen atmosphere at 800° C. for 8 hours for dehydrating and calcining, and finally crushing the resulting calcined product into particles (pellets) of 1.4–4.0 mm. The raw char material consisted of 78% solid carbon, 9% volatile components, 3% ash and 10% water, and the raw slaked lime material was the standard product of JIS R9001. The prepared reagent pellets were analyzed and found to contain carbon (C) and calcium oxide (CaO) as the major components, in a molar ratio C/CaO of 1.67. A thermocouple was inserted in the center of the filled reagent, for measurement of the temperature of the reagent during the reaction.

Perfluoroethane ($C_2F_6$) was used as the fluorocarbon for decomposition and, as shown in FIG. 1, oxygen gas was added to the perfluoroethane while nitrogen gas was introduced into the above-mentioned reaction tube as the carrier. The treatment gas flow rate at this time was kept constant at 0.15 liters/min, and 5 tests (Nos. 1–5) were conducted while changing only the amount of oxygen gas added. In all of the cases, the amount of fluorocarbon in the treatment gas was kept constant at 10 vol %. All of the tests were conducted by initiating current to the heating element during introduction of the treatment gas, and confirming that the temperature at the center of the reagent had reached 800° C. During the reaction, the current was controlled to the tubular furnace so as to maintain a temperature of 800° C. as measured by the thermocouple inserted in the center of the reagent (the position of maximum temperature within the reagent mass). This maintained reaction temperature will hereunder be referred to as the "maximum reagent temperature".

Part of the exhaust gas discharged from the reaction tube, as shown in FIG. 1, is continuously sampled and directed to a gas analyzer, while the remainder passes through a fluorine absorption bottle filled with a caustic soda solution and is discharged out of the system. The exhaust gas was analyzed for fluorocarbons in the exhaust gas, as well as fluorine compounds, $O_2$, $N_2$, $CO_2$ and CO. Gas chromatography was used for fluorocarbon, $O_2$, $N_2$ and $CO_2$, a CO gas detector tube was used for CO, and ion chromatography was used for the other fluorine compounds.

Table 1 shows the reaction conditions and reaction results for each of the tests (Nos. 1–5). The decomposition rate after 30 minutes, the fluorocarbon decomposition amount and the reagent CaO consumption rate shown in the reaction results column in Table 1 were determined in the following manner.

Decomposition rate after 30 minutes

The amount of fluorocarbon remaining in the exhaust gas was measured from an exhaust gas sample taken after 30 minutes from the start of the reaction, and was expressed as the percentage of fluorocarbon in the exhaust gas with respect to the fluorocarbon in the treatment gas.

Fluorocarbon decomposition amount (g)

This is the amount of fluorocarbon decomposed up to the end point of the reaction. The reaction end point is the point at which the decomposition rate falls to 95%. The decomposition rate is determined every 30 minutes from the exhaust gas analysis value every 30 minutes, and the amount of decomposition during the 30 minutes is the value of the amount of fluorocarbon flowing in every 30 minutes multiplied by the decomposition rate at that time, while the fluorocarbon decomposition amount (g) is the cumulative value for the amount of decomposition up to the time at which the decomposition rate falls to 95% from the start of the reaction.

Reagent CaO consumption rate

This is the percentage of CaO in the reagent consumed up to the end point of the reaction. The consumption of CaO is assumed to occur by production of $CaF_2$, and the cumulative amount of fluorine bonded to Ca is determined from the cumulative amount of fluorine in the fluorocarbon decomposed up to the end point of the reaction and the cumulative amount of fluorine detected in the exhaust gas, and the amount of CaO consumed up to the end point of the reaction is then calculated.

The results in Table 1 show that for No.1 in which the oxygen concentration in the treatment gas was 0% the decomposition rate after 30 minutes reached nearly 100%, but the amount of fluorocarbon decomposed up to the reaction end point was 13 g, whereas with higher oxygen concentrations as in Nos. 2–4 the decomposition rate after 30 minutes also reached 100%, while the amounts of fluorocarbon decomposed up to the reaction end point increased to 31, 51 and 52 g, respectively. When the oxygen concentration was even higher as in No.5, the amount of fluorocarbon decomposed up to the reaction end point was somewhat lower. Also, as seen by the CO measurement for Nos. 3 and 4, No.4, which had the greater amount of oxygen addition, had a greater amount of CO in the exhaust gas than No.3.

EXAMPLE 2

Tests (Nos. 6–9) were conducted in the same manner as described in Example 1, except for maintaining a constant oxygen concentration of 5 vol % in the treatment gas and using reagents with different C/CaO molar ratios. The mixing ratios of the char and slaked lime were varied, pellets prepared in the same manner as Example 1 were analyzed, the amounts of C and CaO in the pellets were measured, and the C/CaO molar ratios of the reagents were determined from these measured values. The test results are listed in Table 1. These results demonstrate that the decomposition amount up to the reaction end point for perfluoroethane is influenced by the molar ratio of C/CaO. In this example, the best results were achieved with a C/CaO molar ratio of about 1.7.

EXAMPLE 3

Tests were conducted in the same manner as described in Example 1, except that perfluoromethane was used instead of perfluoroethane. The oxygen concentration was changed to 0% (No.10) and 10% (No.11). The test results are listed in Table 1, and demonstrate that in this example as well the decomposition amount up to the reaction end point was increased considerably by the addition of oxygen.

EXAMPLE 4

Tests were conducted in the same manner as described in Example 1, except that trifluoromethane was used instead of perfluoroethane. The fluorocarbon concentration and oxygen concentration were both maintained at 5 vol %, the gas flow rate was 0.12 liters/min, and the reagent C/CaO molar ratio was 1.67, while different maximum reagent temperatures were used (Nos. 12–17). The test results listed in Table 1 demonstrate that when the maximum reagent temperature was less than 400° C., the decomposition rate after 30 minutes was low, but as the temperature increased to over 400° C. a decomposition rate of near 100% was achieved.

Comparative Example

Trichlorotrifluoroethane, which has chlorine as a constituent, was provided for decomposition treatment according to the manner described in Example 1. The reaction conditions and reaction results are listed in Table 1. In this case, the decomposition amount was greater when oxygen was not present in the treatment gas (Comparative Example 1), while the decomposition amount was reduced when oxygen was present (Comparative Example 2).

EXAMPLE 5

Perfluoroethane was provided for decomposition treatment under the same reaction conditions as Test No.3 of Example 1, but upon adding oxygen to the exhaust gas (CO concentration: 20%) after adding nitrogen, as shown in FIG. 2, it was directed to an exhaust gas oxidizing apparatus 26 and passed through a catalyst layer 27 (Test No.18). The nitrogen addition rate was 5.0 liters/min, the oxygen addition rate was 1.5 liters/min, and the catalyst used was a commercially available product (Nikki Kagaku, KK.) of alumina carrying 0.5% platinum. The results in Table 1 show that the CO concentration in the exhaust gas reached 0%.

EXAMPLE 6

Perfluoroethane was provided for decomposition treatment under the same reaction conditions as Example 1, Test No.3, except that the reaction temperature was 700° C. (Test No.19). The results in Table 1 show that although slightly lower compared to No.3 which was at 800° C., the decomposition was still adequate.

EXAMPLE 7

A test was conducted in the same manner as Example 4 except that 1,1,1,2-tetrafluoroethane ($C_2H_2F_4$) was used instead of trifluoromethane ($CHF_3$) (Test No.20). The maximum reaction accelerator temperature here was 350° C. The results in Table 1 show that a decomposition rate of near 100% was achieved even at 350° C.

TABLE 1

| | | | Reaction conditions | | | | |
|---|---|---|---|---|---|---|---|
| Example No. | Test No. | Fluorocarbon | Fluorocarbon concentration (vol %) | Oxygen concentration vol % | Gas flow rate l/min | Reagent C/CaO molar ratio | Maximum reagent temperature ° C. |
| Ex. 1 | 1 | Perfluoroethane $C_2F_6$ | 10 | 0 | 0.15 | 1.67 | 800 |
| | 2 | " | 10 | 1 | 0.15 | 1.67 | 800 |
| | 3 | " | 10 | 5 | 0.15 | 1.67 | 800 |
| | 4 | " | 10 | 10 | 0.15 | 1.67 | 800 |
| | 5 | " | 10 | 20 | 0.15 | 1.67 | 800 |
| Ex. 2 | 6 | Perfluoroethane $C_2F_6$ | 10 | 5 | 0.15 | 0.78 | 800 |
| | 7 | " | 10 | 5 | 0.15 | 1.17 | 800 |
| | (3) | " | 10 | 5 | 0.15 | 1.67 | 800 |
| | 8 | " | 10 | 5 | 0.15 | 2.06 | 800 |
| | 9 | " | 10 | 5 | 0.15 | 2.70 | 800 |
| Ex. 3 | 10 | Perfluoromethane $CF_4$ | 10 | 0 | 0.15 | 1.67 | 800 |
| | 11 | " | 10 | 10 | 0.15 | 1.67 | 800 |

TABLE 1-continued

| Ex. 4 | 12 | Trifluoromethane CHF$_3$ | 5 | 5 | 0.12 | 1.67 | 300 |
|---|---|---|---|---|---|---|---|
| | 13 | " | 5 | 5 | 0.12 | 1.67 | 350 |
| | 14 | " | 5 | 5 | 0.12 | 1.67 | 385 |
| | 15 | " | 5 | 5 | 0.12 | 1.67 | 400 |
| | 16 | " | 5 | 5 | 0.12 | 1.67 | 410 |
| | 17 | " | 5 | 5 | 0.12 | 1.67 | 450 |
| Comp. Exs. | 1 | 2,2,2-trichloro-1,1,2-trifluoroethane C$_2$Cl$_3$F$_3$ | 10 | 0 | 0.15 | 1.67 | 860 |
| | 2 | 2,2,2-trichloro-1,1,2-trifluoroethane C$_2$Cl$_3$F$_3$ | 10 | 10 | 0.15 | 1.67 | 860 |
| Ex. 5 | 18 | Perfluoroethane C$_2$F$_6$ | 10 | 5 | 0.15 | 1.67 | 800 |
| Ex. 6 | 19 | Perfluoroethane C$_2$F$_6$ | 10 | 5 | 0.15 | 1.67 | 700 |
| Ex. 7 | 20 | 1,1,1,2-tetrafluoroethane C$_2$H$_2$F$_4$ | 5 | 5 | 0.12 | 1.67 | 350 |

| | | Reaction results | | | |
|---|---|---|---|---|---|
| Example No. | Test No. | Decomposition rate after 30 minutes (%) | Fluorocarbon decomposition amount (g) | Reagent CaO consumption rate (%) | Exhaust gas CO concentration (%) |
| Ex. 1 | 1 | 99.9 | 13 | 22 | |
| | 2 | 99.9 | 31 | 53 | |
| | 3 | 99.9 | 51 | 88 | 20 |
| | 4 | 99.9 | 52 | 90 | 30 |
| | 5 | 99.9 | 31 | 53 | |
| Ex. 2 | 6 | 97.3 | 13 | 20 | |
| | 7 | 99.9 | 39 | 63 | |
| | (3) | 99.9 | 51 | 88 | 20 |
| | 8 | 99.9 | 39 | 72 | |
| | 9 | 99.6 | 26 | 53 | |
| Ex. 3 | 10 | 98.2 | 7 | 13 | |
| | 11 | 99.9 | 54 | 97 | |
| Ex. 4 | 12 | 34.3 | | | |
| | 13 | 56.9 | | | |
| | 14 | 85.6 | | | |
| | 15 | 99.8 | 60 | 94 | |
| | 16 | 99.7 | 60 | 94 | |
| | 17 | 99.9 | 61 | 95 | |
| Comp. Exs. | 1 | 99.9 | 55 | 70 | |
| | 2 | 99.9 | 13 | 16 | |
| Ex. 5 | 18 | 99.9 | 51 | 83 | 0 |
| Ex. 6 | 19 | 89.5 | | | |
| Ex. 7 | 20 | 96.8 | 56 | 82 | |

EXAMPLE 8

The process of the present invention was carried out using an apparatus based on the same principle shown in FIG. 1. That is, a reaction tube of Inconel 600 (trademark) with an inner diameter of 16 mm and a length of 30 mm was inserted along the axial center of a tubular furnace (electrical capacity: 0.4 KW) equipped with a heating element (kanthal alloy) based on electrical heating, and the center of the furnace inside the reaction tube was filled with 35 g of a reagent for decomposing a fluorocarbon.

The reagent was a granulated product prepared by the following procedures using char, slaked lime and potassium hydroxide as starting materials.

Char with a maximum particle size of 250 μm, slaked lime with a maximum particle size of 250 μm and potassium hydroxide were mixed with various proportions, water was added and the mixture was granulated. Then, the granulated mixture was dried at 110° C. for 4 hours and heated at 800° C. for 8 hours for dehydrating and calcining, and the resulting calcined product was subjected to dressing of grain to obtain pellets of a maximum particle size of 10 mm and an average particle size of about 3 mm.

The starting char consisted of 78% solid carbon, 9% volatile components, 3% ash and 10% water, the starting slaked lime was the standard product of JIS R9001, and the employed potassium hydroxide was a first class grade chemical. The resulting reagent pellets were analyzed and found to contain simple substance carbon (C) and calcium oxide (CaO) as the major components as well as a minor amount of potassium (K). The atomic ratios of C, Ca and K or these reagent pellets and the total weight (in %) of the components based on the weight of the reagent are shown in Table 2.

Perfluoroethane (C$_2$F$_6$) was decomposed in the same manner as mentioned in Example 1, except that the treatment gas flow rate was 0.17 liter/min, the amount of fluorocarbon in the treatment gas was 5 vol %, and the temperature at the center of the reagent,i.e., the maximum reagent temperature was 700° C.

The reaction conditions employed and the reaction results as measured in the same manner as mentioned in Example 1 are shown in Table 2 for each of 7 tests (Nos. 21–27).

TABLE 2

| | | | Reaction conditions | | | | | | Ca, C, K atomic ratio in reagent | | Ca, C, K total amount in reagent wt % | Reaction results | |
|---|---|---|---|---|---|---|---|---|---|---|---|---|---|
| Example No. | Test No. | Fluoro-carbon | Fluoro-carbon concen-tration vol % | Oxygen concen-tration vol % | Gas flow rate l/min | SV Hr$^{-1}$ | LV cm/min | | Ca/C atomic ratio | Ca/K atomic ratio | | Decomposition rate after 30 minutes % | Amount of decomposed fluorocarbon g/cc |
| Ex. 8 | 21 | $C_2F_6$ | 5 | 5 | 0.17 | 680 | 0.85 | | 1/1.56 | 1/0.014 | 79 | 73 | — |
| | 22 | $C_2F_6$ | 5 | 5 | 0.17 | 680 | 0.85 | | 1/1.56 | 1/0.025 | 79 | 82 | — |
| | 23 | $C_2F_6$ | 5 | 5 | 0.17 | 680 | 0.85 | | 1/1.56 | 1/0.040 | 79 | 97 | — |
| | 24 | $C_2F_6$ | 5 | 5 | 0.17 | 291 | 0.85 | | 1/1.56 | 1/0.19 | 79 | 89 | — |
| | 25 | $C_2F_6$ | 5 | 5 | 0.17 | 291 | 0.85 | | 1/1.56 | 1/0.04 | 79 | 99.9 | 250 |
| | 26 | $C_2F_6$ | 5 | 5 | 0.17 | 291 | 0.85 | | 1/1.56 | 1/0.06 | 79 | 99.9 | 330 |
| | 27 | $C_2F_6$ | 5 | 5 | 0.17 | 291 | 0.85 | | 1/1.56 | 1/0.10 | 79 | 99.9 | 250 |

The results in Table 2 show that in all tests, $C_2F_6$ was decomposed at a reaction temperature of 700° C. and the decomposition rate after 30 minutes was increased as the K concentration in the reagent was increased. That is, the decomposition rate was about 100% in each of the cases where the atomic ratio of K to Ca was 0.04 to 0.10 and the decomposition amount was maximum at an atomic ratio of K to Ca of 0.06. As seen from the results in Nos. 21–23, the decomposition reaction occurred at an atomic ratio of K to Ca of less than 0.04, but the decomposition rate was low at the reaction temperature of 700° C. On the other hand, as seen from the results in No. 24, when the K concentration was too high, the decomposition efficiency was lowered. In this example, it is proved from the comparison of Nos. 25, 26 and 27 that the decomposition efficiency is maximum at a K concentration corresponding to an atomic ratio of Ca/C of about 1/0.06.

EXAMPLE 9

The procedures as mentioned in Example 8 were repeated, except that other potassium compounds as shown in Table 3 were used instead of potassium hydroxide. The results are shown in Table 3.

As seen from Table 3, in all cases of using potassium carbonate, aluminate, phosphate, sulfate and nitrate as the potassium source, the decomposition rate was approximately 100% at 700° C.

EXAMPLE 10

The procedures as mentioned in Example 8 were repeated, except that the amount of the potassium incorporated in the reagent was varied, including the case where a reagent containing no potassium was used, and the content of oxygen in the treatment gas was varied, including the case where a treatment gas containing no oxygen was used. The results are shown in Table 4.

TABLE 3

| | | | Reaction conditions | | | | | | | Ca, C, K atomic ratio in reagent | | Ca, C, K total amount in reagent wt % | Maximum reagent temperature ° C. | Reaction results Decomposition rate after 30 minutes % |
|---|---|---|---|---|---|---|---|---|---|---|---|---|---|---|
| Example No. | Test No. | Fluoro-carbon | Fluoro-carbon concen-tration vol % | Oxygen concent-ration vol % | Gas flow rate L/min | SV Hr$^{-1}$ | LV cm/min | K salt | | Ca/C atomic ratio | Ca/K atomic ratio | | | |
| Ex. 9 | 28 | $C_2F_6$ | 5 | 5 | 0.17 | 291 | 0.85 | $K_2CO_3$ | | 1/1.56 | 1/0.04 | 79 | 700 | 99.9 |
| | 29 | $C_2F_6$ | 5 | 5 | 0.17 | 291 | 0.85 | $K_2AlO_4$ | | 1/1.56 | 1/0.04 | 78 | 700 | 99.9 |
| | 30 | $C_2F_6$ | 5 | 5 | 0.17 | 291 | 0.85 | $K_2PO_4$ | | 1/1.56 | 1/0.04 | 78 | 700 | 99.9 |
| | 31 | $C_2F_6$ | 5 | 5 | 0.17 | 291 | 0.85 | $K_2SO_4$ | | 1/1.56 | 1/0.04 | 77 | 700 | 99.0 |
| | 32 | $C_2F_6$ | 5 | 5 | 0.17 | 291 | 0.85 | $KNO_3$ | | 1/1.56 | 1/0.04 | 77 | 700 | 98 |

TABLE 4

| Example No. | Test No. | Fluoro-carbon | Fluoro-carbon concentration vol % | Oxygen concentration vol % | Gas flow rate L/min | SV Hr⁻¹ | LV cm/min | Ca/C atomic ratio | Ca/K atomic ratio | Ca, C, K total amount in reagent wt % | Maximum reagent temperature °C | Decomposition rate after 30 minutes % | Amount of decomposed fluorocarbon g/cc | Reagent CaO consumption rate % |
|---|---|---|---|---|---|---|---|---|---|---|---|---|---|---|
| Ex. 10 | 33 | $C_2F_6$ | 5 | 5 | 0.17 | 291 | 0.85 | 1/1.56 | 1/0 | 79 | 700 | 53.1 | — | — |
|  | 34 | $C_2F_6$ | 5 | 5 | 0.17 | 291 | 0.85 | 1/1.56 | 1/0.04 | 79 | 700 | 99.9 | 250 | 56 |
|  | 35 | $C_2F_6$ | 5 | 0 | 0.17 | 291 | 0.85 | 1/1.56 | 1/0.04 | 79 | 700 | 99.9 | 210 | 53 |
|  | 36 | $C_2F_6$ | 10 | 10 | 0.17 | 291 | 0.85 | 1/1.56 | 1/0.04 | 79 | 800 | 99.9 | 245 | — |
|  | 37 | $C_2F_6$ | 10 | 20 | 0.17 | 291 | 0.85 | 1/1.56 | 1/0.04 | 79 | 800 | 99.0 | 150 | — |

As seen from Table 4, the decomposition temperature was lowered when the reagent containing no potassium was used, the decomposition was satisfactorily effected even where the treatment gas contained no oxygen, and the decomposition efficiency was somewhat low at the oxygen concentration of 20 vol %.

EXAMPLE 11

The procedures as mentioned in Example 8 were repeated, except that other fluorocarbons were employed for decomposition, and the content of oxygen in the treatment gas was varied. The results are shown in Table 5.

TABLE 5

| Example No. | Test No. | Fluoro-carbon | Fluoro-carbon concentration vol % | Oxygen concentration vol % | Gas flow rate L/min | SV Hr⁻¹ | LV cm/min | Ca/C atomic ratio | Ca/K atomic ratio | Ca, C, K total amount in reagent wt % | Maximum reagent temperature °C | Decomposition rate after 30 minutes % | Amount of decomposed fluorocarbon g/cc | Reagent CaO consumption rate % |
|---|---|---|---|---|---|---|---|---|---|---|---|---|---|---|
| Ex. 11 | 38 | $CF_4$ | 5 | 5 | 0.17 | 291 | 0.85 | 1/1.56 | 1/0.04 | 79 | 750 | 99.9 | 290 | 80 |
|  | 39 | $CF_4$ | 5 | 0 | 0.17 | 291 | 0.85 | 1/1.56 | 1/0.04 | 79 | 750 | 99.9 | 240 | 73 |
|  | 40 | $CHF_3$ | 5 | 5 | 0.17 | 291 | 0.85 | 1/1.56 | 1/0.04 | 79 | 350 | 99.9 | 340 | 89 |
|  | 41 | $CHF_3$ | 5 | 0 | 0.17 | 291 | 0.85 | 1/1.56 | 1/0.04 | 79 | 350 | 99.9 | 340 | 89 |
|  | 42 | $C_2F_1Cl_5$ | 5 | 5 | 0.17 | 291 | 0.85 | 1/1.56 | 1/0.04 | 79 | 350 | 99.9 | — | — |
|  | 43 | $C_2F_3Cl_3$ | 5 | 0 | 0.17 | 291 | 0.85 | 1/1.56 | 1/0.04 | 79 | 350 | 99.0 | — | — |
|  | 44 | $C_2F_2Cl_2$ | 5 | 5 | 0.17 | 291 | 0.85 | 1/1.56 | 1/0.04 | 79 | 350 | 99.0 | — | — |
|  | 45 | $CF_2Cl_2$ | 5 | 0 | 0.17 | 291 | 0.85 | 1/1.56 | 1/0.04 | 79 | 350 | 99.0 | — | — |

As seen from Table 5, all of the tested fluorocarbons could be completely decomposed. In particular, the chlorine-containing fluorocarbons could be decomposed with a decomposition rate of approximately 100% even at a low temperature of 350° C. No significant difference was found between the cases where oxygen existed in the treatment gas and where oxygen did not exist in the treatment gas.

EXAMPLE 12

The procedures as mentioned in Example 8 were repeated, except that $Mg(OH)_2$ was used instead of slaked lime, $Ca(OH)_2$, and $CF_4$ was used as the fluorocarbon for decomposition. The results are shown in Table 6.

TABLE 6

| Example No. | Test No. | Fluoro-carbon | Reaction conditions ||||||||| Reaction results |||
|---|---|---|---|---|---|---|---|---|---|---|---|---|---|
| | | | Fluoro-carbon concen-tration vol % | Oxygen concent-ration vol % | Gas flow rate L/min | SV Hr$^{-1}$ | LV cm/min | Mg/C atomic ratio | Mg/K atomic ratio | Mg, C, K amount in reagent wt % | Maximum reagent tempera-ture °C. | Decompo-sition rate after 30 minutes % | Amount of decom-posed fluoro-carbon g/cc | Re-agent CaO con-sump-tion rate % |
| Ex. 11 | 46 | CF$_4$ | 5 | 5 | 0.17 | 291 | 0.85 | 1/1.56 | 1/0.036 | 83 | 700 | 72.2 | — | — |

As seen from Table 6, when the reagent containing Mg as the alkaline earth metal was used, CF$_4$ could be decomposed, but the decomposition efficiency was somewhat low as compared with the case where Ca was used as the alkaline earth metal.

EXAMPLE 13

The procedures as mentioned in Example 8 were repeated, except that CF$_4$ was also used as the fluorocarbon for decomposition, and the concentration of the fluorocarbon in the treatment gas was 100%. The results are shown in Table 7.

TABLE 7

| Example No. | Test No. | Fluoro-carbon | Reaction conditions ||||||||| Reaction results |||
|---|---|---|---|---|---|---|---|---|---|---|---|---|---|
| | | | Fluoro-carbon concen-tration vol % | Oxygen concent-ration vol % | Gas flow rate L/min | SV Hr$^{-1}$ | LV cm/min | Ca/C atomic ratio | Ca/K atomic ratio | Ca, C, K total amount in reagent wt % | Maximum reagent tempera-ture °C. | Decompo-sition rate after 30 minutes % | Amount of decom-posed fluoro-carbon g/cc | Re-agent CaO con-sump-tion rate % |
| Ex. 13 | 47 | CF$_4$ | 100 | 0 | 0.17 | 291 | 0.85 | 1/1.56 | 1/0.04 | 79 | 820 | 99.9 | 310 | 80 |
| | 48 | C$_2$F$_6$ | 100 | 0 | 0.17 | 291 | 0.85 | 1/1.56 | 1/0.04 | 79 | 820 | 95.9 | 390 | 73 |

As seen from Table 7, even when the fluorocarbons were used at a concentration of 100% without dilution, good results could be obtained as in Example 8.

As explained above, the present invention allows complete decomposition of fluorocarbons by a simple process, wherein the decomposed fluorine is bound in a harmless form. Consequently, the fluorocarbon decomposition process according to the invention provides the heretofore unachieved effect of allowing a simpler decomposition apparatus and giving higher decomposition efficiency, as well as simpler post-treatment of the decomposition products and lower cost of the reagents, and can provide a particularly notable contribution for the decomposition of fluorocarbons and contained in the exhaust gas from semiconductor manufacturing processes.

What is claimed is:

1. A process for decomposing a fluorocarbon which comprises contacting a perfluorocarbon or hydrofluorocarbon gas with a reagent consisting essentially of elemental carbon and at least one alkaline earth metal compound, at a temperature of 300° C. or higher and in the presence of more than 0 vol % and up to 20 vol % of gaseous oxygen, wherein said at least one alkaline earth metal compound is selected from the group consisting of oxides, hydroxides, carbonates, and nitrates of alkaline earth metals.

2. A process according to claim 1, wherein said elemental carbon comprises a carbonaceous solid material.

3. A process according to claim 2, wherein the carbonaceous solid material is one or more members selected from the group consisting of coke powder, char, coal, raw pitch, charcoal, active carbon and carbon black, and the alkaline earth metal compound is an oxide, hydroxide, carbonate or nitrate of calcium, magnesium, barium or strontium.

4. A process according to claim 1, wherein a halogen component from the decomposed fluorocarbon is fixed to said reagent.

5. A process according to claim 1, which comprises continuously or intermittently feeding a treatment gas containing a perfluorocarbon or hydrofluorocarbon to a reactor filled with said reagent, continuously or intermittently discharging an exhaust gas from said reactor after reaction, allowing or causing oxygen to be contained in the treatment gas before it is introduced into the reactor so that the oxygen concentration is 20 vol % or less in said treatment gas, and transferring heat necessary for decomposition of said perfluorocarbon or hydrofluorocarbon from outside the reactor to a reaction zone, or from inside the reactor to the reaction zone.

6. A process according to claim 5, wherein the heat transferred to the reaction zone is generated by an electrical heater which employs an electrical heat-generating heating element.

7. A process according to claim 5, wherein the reagent is filled into a metal or ceramic reactor.

8. A process according to claim 1, which comprises continuously or intermittently feeding a treatment gas containing a perfluorocarbon or hydrofluorocarbon to a reactor filled with said reagent, continuously or intermittently discharging an exhaust gas from said reactor after reaction, allowing or causing oxygen to be contained in the treatment gas before it is introduced into the reactor so that the oxygen concentration is 20 vol % or less in said treatment gas, transferring heat necessary for decomposition of said perfluorocarbon or hydrofluorocarbon from outside the reactor to a reaction zone, or from inside the reactor to the reaction zone, and oxidizing CO in said exhaust gas to $CO_2$.

9. A process according to claim 8, wherein the step of oxidizing CO is performed using an oxidizing catalyst or reagent.

10. A process according to claim 1, wherein the perfluorocarbon or hydrofluorocarbon is a fluorocarbon with 1–5 carbon atoms.

11. A process according to claim 1, wherein the reagent is in a granulated form prepared by mixing a powdery carbonaceous solid material and powdery alkaline earth metal compound and granulating the mixture.

12. A process for decomposing a fluorocarbon which comprises contacting a gaseous fluorocarbon with a reagent consisting essentially of elemental carbon, at least one alkaline earth metal compound selected from the group consisting of oxides, hydroxides, carbonates, and nitrates of alkaline earth metals and at least one alkali metal compound selected from the group consisting of hydroxides, carbonates, phosphates, aluminates, nitrates, and sulfates of alkali metals at a temperature of 200° C. or higher, wherein the gaseous fluorocarbon to be contacted with the reagent contains 0.01 to 25% by volume of oxygen.

13. A process according to claim 12, wherein said elemental carbon comprises a carbonaceous solid material.

14. A process according to claim 12, wherein the reagent consists essentially of at least one alkaline earth metal compound elemental, carbon, and at least one alkali metal compound in an atomic ratio of alkaline earth metal compound: elements carbon: alkali metal compound of 1.0:0.25–4.0:0.01–0.3.

15. A process according to claim 12, wherein not less than 50% by weight of the alkaline earth metal compound is oxides.

16. A process according to claim 12, wherein a halogen component of said fluorocarbon is fixed to said reagent.

17. A process according to claim 12, wherein the fluorocarbon is a perfluorocarbon consisting of fluorine and carbon or a hydrofluorocarbon consisting of fluorine, hydrogen and carbon.

18. A process according to claim 12, wherein the fluorocarbon is a halogenated fluorocarbon consisting of fluorine, carbon and a halogen other than fluorine or a halogenated hydrofluorocarbon consisting of fluorine, hydrogen a halogen other than fluorine and carbon.

* * * * *

UNITED STATES PATENT AND TRADEMARK OFFICE
CERTIFICATE OF CORRECTION

PATENT NO. : 6,294,709 B1
DATED : September 25, 2001
INVENTOR(S) : Chiaki Izumikawa, Kazumasa Tezuka, Kazuto Ito, Hitoshi Atobe and Toraichi Kaneko It is certified that error appears in the above-identified patent and that said Letters Patent is hereby corrected as shown below:

<u>Title page,</u>
Item [73], Assignees, "Dowa Iron Power Co., Ltd." should read -- Dowa Iron Powder Co., Ltd. --.

Signed and Sealed this

Twenty-third Day of April, 2002

Attest:

JAMES E. ROGAN
*Attesting Officer*     *Director of the United States Patent and Trademark Office*